(No Model.) 7 Sheets—Sheet 1.

J. PRATT.
TYPE WRITING MACHINE.

No. 394,995. Patented Dec. 25, 1888.

Fig. 1

Attest:
Geo. H. Betts
D. J. Kennedy

Inventor
John Pratt
per Behrens & Cady
Att'ys (No Model.)  7 Sheets—Sheet 2.

J. PRATT.
TYPE WRITING MACHINE.

No. 394,995.  Patented Dec. 25, 1888.

(No Model.)

J. PRATT.
TYPE WRITING MACHINE.

Patented Dec. 25, 1888.

(No Model.)

J. PRATT.
TYPE WRITING MACHINE.

No. 394,995.  Patented Dec. 25, 1888.

(No Model.)

J. PRATT.
TYPE WRITING MACHINE.

No. 394,995.  Patented Dec. 25, 1888.

(No Model.) 7 Sheets—Sheet 7.

J. PRATT.
TYPE WRITING MACHINE.

No. 394,995. Patented Dec. 25, 1888.

UNITED STATES PATENT OFFICE.

JOHN PRATT, OF NEW YORK, N. Y.

TYPE-WRITING MACHINE.

SPECIFICATION forming part of Letters Patent No. 394,995, dated December 25, 1888.

Application filed June 8, 1886. Serial No. 204,450. (No model.)

*To all whom it may concern:*

Be it known that I, JOHN PRATT, residing in the city, county, and State of New York, have invented a new and useful Improvement in Type-Writing Machines, of which the following is a specification.

This invention relates to that class of type-writing machines employing a type-carrier, and has for its objects, first, to cause the type-carrier to automatically strike the platen; second, to improve the mechanism for moving the type to the impression-point and there arresting it, and also for adjusting easily and conveniently its position and the moment of its placement; third, to improve the feed mechanism; fourth, to improve the arrangement of the key-board with reference to the compound movement of the type-carrier; fifth, to improve the mechanism for detaching the feed-gearing of the paper-carriage; sixth, to improve the paper-carriage; seventh, to automatically shift the ribbon-spool mechanism; eighth, to automatically move the ink-ribbon in and out of the field of impression, so as to display each impression as soon as made; ninth, to automatically prevent the type from making an impression when the space-key is struck.

In the accompanying drawings, Fig. 6' is a detail of the device for sustaining the paper-carriage in an upright position. Figs. 20 and 21 are sectional details of the ribbon-spool mechanism.

Figure 14:
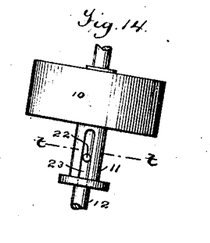
Fig. 14 is a detail showing a modification for securing the type-wheel sleeve to its shaft.
Figure 15:
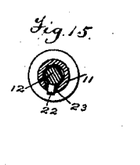
Fig. 15 is a section on line *t t* of Fig. 14.
Figure 16:
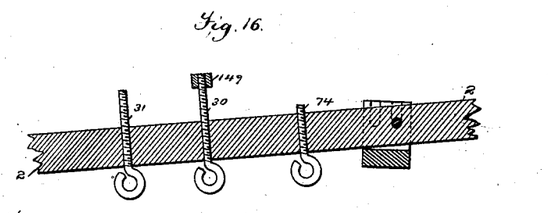
Fig. 16 is a detail showing a key-lever with adjusting-pins.
Figures 17, 19:
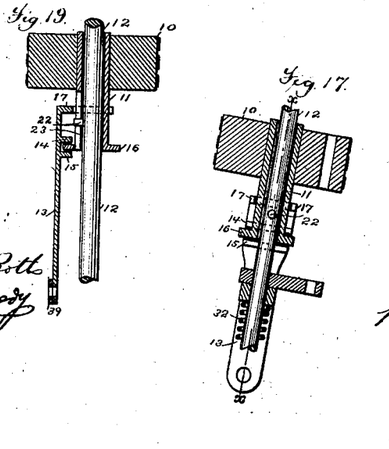
Fig. 17 is a detail of type-wheel and sleeve in section and shifter-arm, looking from the right of the machine.
Fig. 19 is a section on line *x x* of Fig. 17, looking from the rear of the machine.

Referring to the drawings, 1 indicates the base-frame, in which play the key-levers 2, and which serves as a support for the shafts of the shift-bars 4 and 5, the transverse lever 66, the driver-levers 3, the key-levers 2, the carriage-rail 9, the paper-roll supports 77, and the main spring 57. A striking type-carrier or type-wheel, 10, is employed, having on its periphery, preferably, three rows of relief type. The type-wheel is held in position on its shaft by means of a shifter-arm, 13, having near its upper end a projection, 14, with a slot, 15, engaging the flange 16 of the hub 11, so as to shift the type-wheel vertically, in order to present the upper and lower rows of type to the platen, and yet to allow the hub and shaft to turn freely meanwhile. Forked arm 17 on shifter-arm 13 keeps the latter in place on shaft 12. The shifter-arm 13 is flexible, so that it can be bent back to release forked arms 14 and 17 and allow the wheel to be slipped off. To cause the type-wheel to turn with its shaft, and at the same time to have vertical play, an arm, 18, is slipped over the upper end of shaft 12 and secured by a nut, 19, and on the end of arm 18 is a pin, 20, which is located in a socket, 21, in wheel 10 and plays freely up and down therein. In lieu of the device just described, the shaft 12 may be formed with a spline, 22, which engages a slot, 23, in the hub, as shown in Figs. 14 and 15, so that the wheel may be removed more readily. In this way interchangeable type-wheels may be more quickly substituted. The lower end of shaft 12 rests loosely in the pivot-pin of a vibrating bent lever-arm, 7, pivoted in a forked arm, 8, secured to the rail of the paper-carriage. The bent lever-arm 7 has an arm at its upper end which supports shaft 12. At the lower end of shaft 12 is a miter-wheel, 24, which engages but normally is out of gear with segmental bevel-wheels 25 on the inner end of check-pin shafts 26, so as to permit one of the segment-gears 25 to engage wheel 24 independently of the other, and thus rotate the type-wheel from left to right or right to left, accordingly as either segmental gear engages the miter-wheel of typeshaft. The outer ends of check-pin shafts 26 have a pinion, 27, which gears with a toothed segment, 28, on the outer ends of driver-levers 3. The check-pin shafts are studded with pins 29, in number corresponding with a single row of type, and arranged in a spiral direction to determine and limit, in connection with adjusting-pins and key-levers, the movement of shafts 26 and type-wheel shaft 12 when the corresponding type is brought to a position to strike; but since in practice it is difficult to accurately adjust the position of the type-wheel when ready to strike by means of said spiral check-pins the key-levers 2 are provided with regulator screw-pins 30, which serve to arrest the check-pins 29, for the purpose of accurately determining the position of the corresponding type at the moment of striking.

Figure 2:
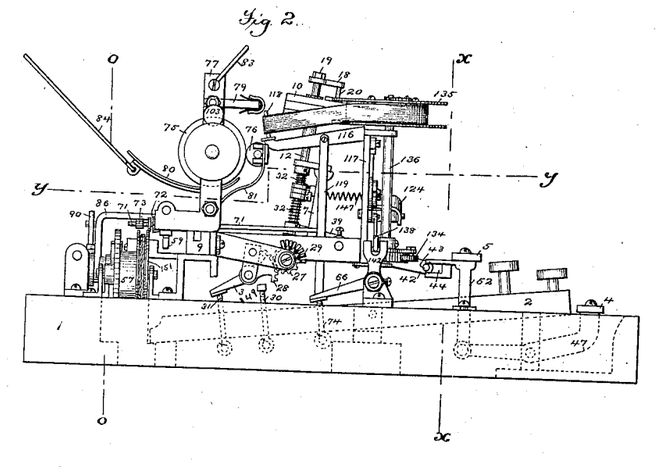
Fig. 2 is a view of the left side of the machine.
Figure 3:
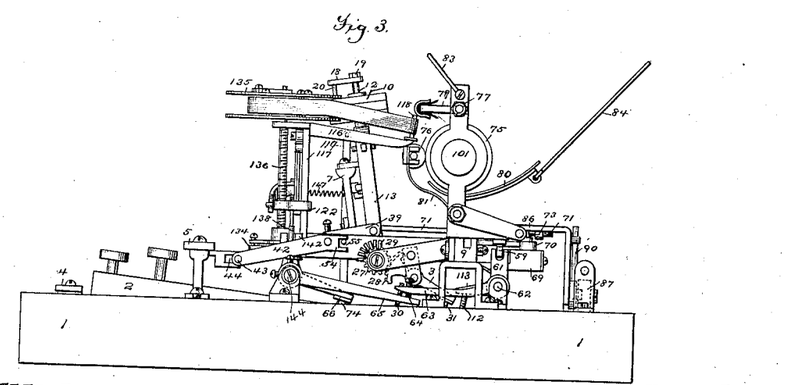
Fig. 3 is a view of the right side of the machine.
Figure 6:
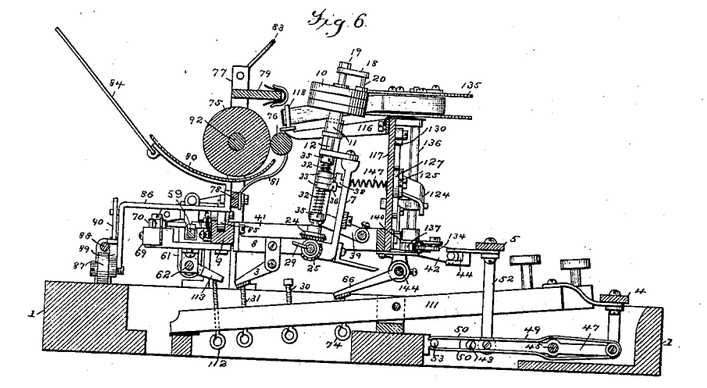
Fig. 6 is a section on line *z z* of Figs. 1 and 4.

The key-levers have also adjusting-pins 31, Figs. 2, 3, and 6, which strike against the driver-levers 3 and determine the degree of revolution of shafts 26 and 12 for each corresponding type.

Figure 4:
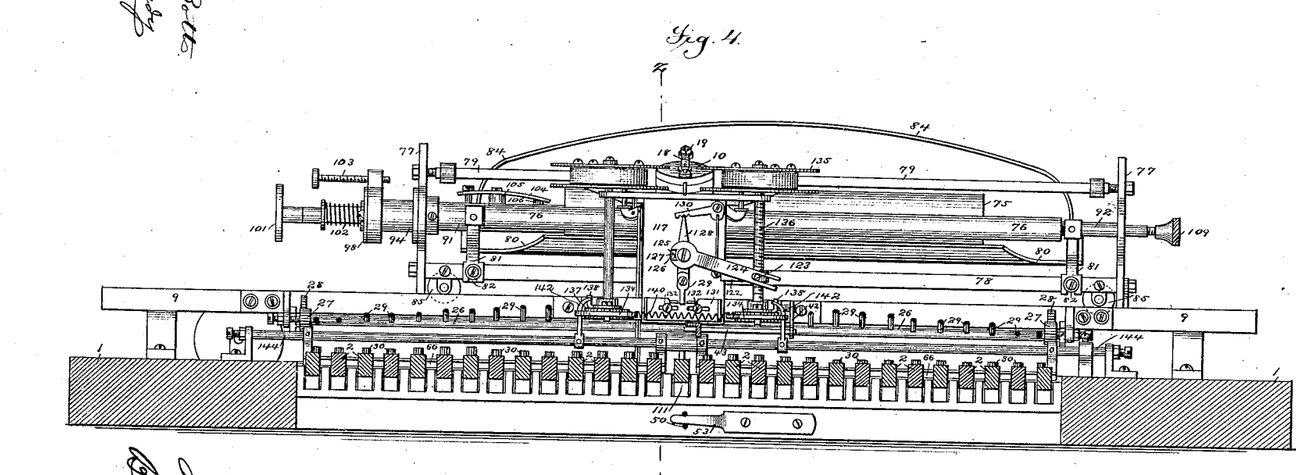
Fig. 4 is a front view in section on the line *x x* of Fig. 2.

The type-wheel is held in and returned to normal position by means of springs 32, their inner ends being secured to loose rings 33, separated by a ring, 34, fixed to the shaft. The outer ends of springs 32 are secured to set-screw collars 35, to adjust the normal tension of the springs. Each ring 33 has a flange or projection, 36, pressing in an opposite direction to its neighbor against the flange or projection 3f of the middle ring and against a projection, 38, on the lever 7, so that one or the other of the springs 32 is under tension, according as the type-wheel is rotated from right to left or left to right. Since the type-wheel shaft is mounted in opposition to the check-springs, the teeth of the gear-wheels are kept in contact and the lost motion between the gearing of type-shaft and check-pin shafts is taken up, and the resulting inaccuracy in printing prevented. The shifter-arm 13 is pivoted on one end of a lever-arm, 39, Fig. 3, having its shaft 40 journaled in frame 41, secured to rail 9, on which shaft 40 is a lever-arm, 42, having at its outer end a pin, 43, which plays in a slot, 44, of a projection of shift-bar, 5. Shift-bar 4 is mounted on one end of rocker-arms 47, pivoted on shaft 45, Fig. 1, at its center and ends, and shift-bar 5 on connecting-bars 52, moving in brackets 46, and pivoted to the opposite ends of lever-arms 47, the whole forming a rocker-lever. The rocker-lever is provided with a double spring, 49, which holds and returns it to a normal position, as it also does the type-wheel through the intervening mechanism described. The spring 49 consists of two spring-arms, 50, bent before being put in position, so as to be in tension when in a normal position, one arm controlling shift-bar 5 and the other shift-bar 4, and limited in their return movement by stop-arm 53, Figs. 4 and 6. The spring-arms 50, held in tension in a normal position and bearing against stop-arm 53 and pin 143, promptly arrest and prevent vibration of the type-wheel when the latter returns to a normal position. The lever-arm 42 has a forked projection, 54, Fig. 3, the arms of which strike a pin, 55, midway between them and limit the vertical movement of the type-wheel in presenting the upper and lower row of type to the platen. Shift-bar 5 by means of the mechanism described lifts the type-wheel so as to bring the lower row of type into the impression-field, and shift-bar 4 lowers the type-wheel to bring the upper row of type into the field of impression.

The capital letters are ranged half on the upper row of type and half on the lower, each capital being in vertical line with its corresponding small letter. Each shift-bar controls the vertical position of half the capital letters, and, in combination with the contiguous row of key-levers, controls both the lateral and vertical position of the capital letters. The advantage of this arrangement is that a capital letter may be formed by striking a key with its contiguous shift-bar, while the more infrequent signs will be formed by striking a given key in combination with the more remote shift-bar. The forward or striking movement of the type-wheel is given by the movement of the paper-carriage 56, drawn forward by main spring 57, carrying a pulley, 151, on which is wound a cord, 152, attached to said carriage, which is wound and regulated as to tension by a pawl and ratchet, 58.

Figure 5:
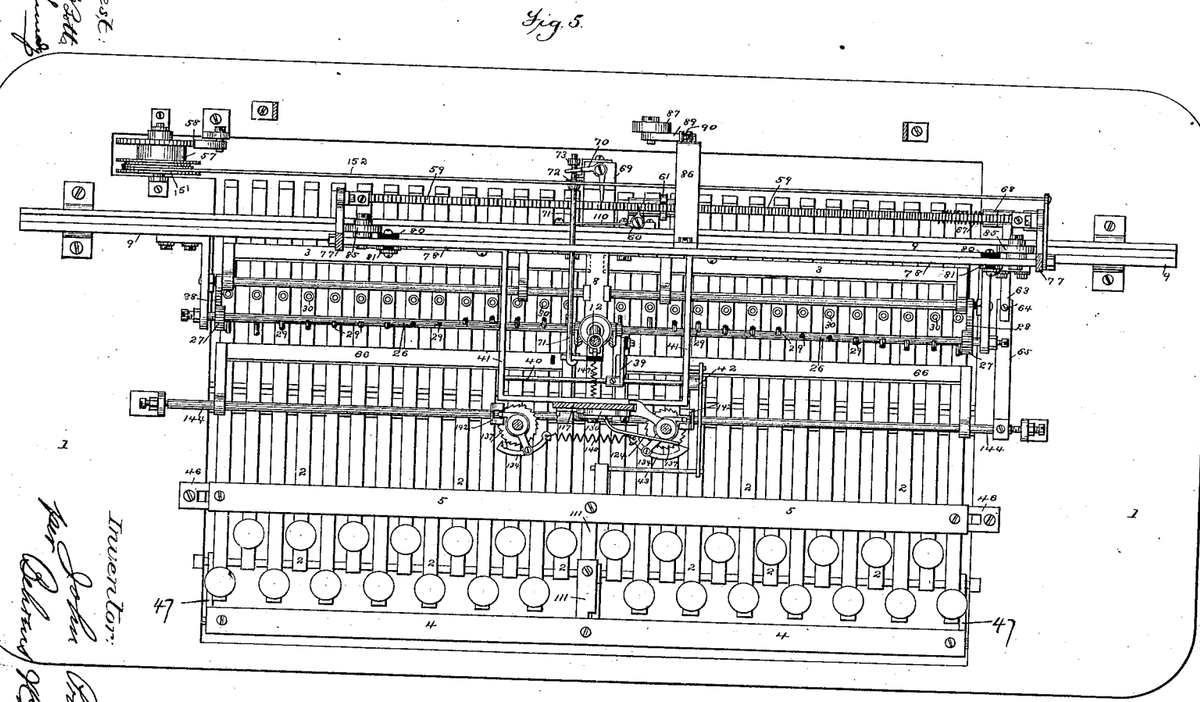
Fig. 5 is a plan view, partly in section, on line *y y*, Fig. 2.
Figures 6, 7, 8, 9:
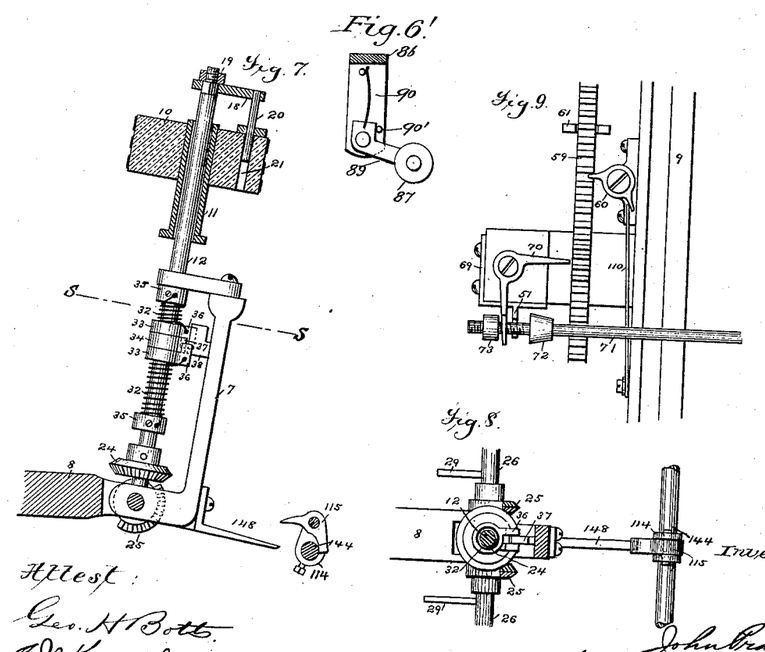
Fig. 7 is a detail of the type-wheel and its shaft.
Fig. 8 is a section on line *s s* of Fig. 7.
Fig. 9 is a plan view of the escapement mechanism with knife stop-lever in engagement with rack-bar.
Figure 10:
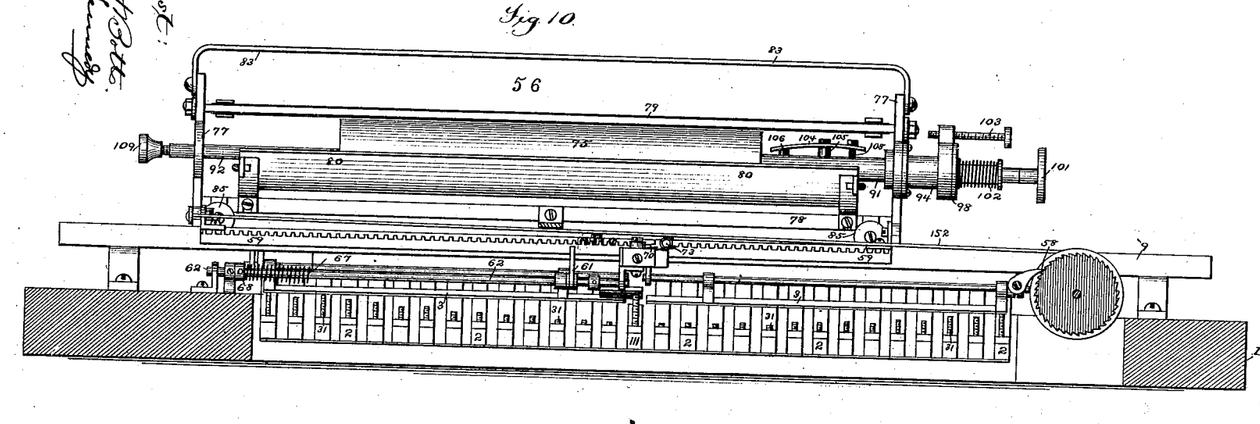
Fig. 10 is a rear view in section on line *o o* of Fig. 2.
Figure 18:
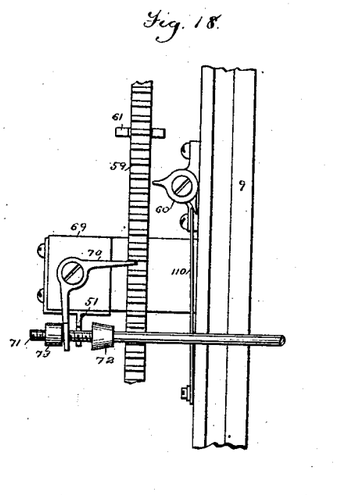
Fig. 18 is a plan view of escapement mechanism with bell-crank lever engaging the rack-bar.
Figure 20:
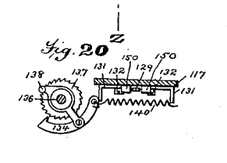
Fig. 20 is a detail through line *z z*, Fig. 4.
Figure 21:
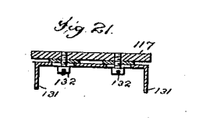
Figure 22:
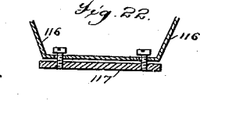
Fig. 22 is a detail of the hinged ribbon-guide arms.

The paper-carriage, to be more fully described hereinafter, has hinged to it a ratchet-bar, 59. This ratchet-bar has an angle-piece screwed to it at each end, said angle-piece being grooved on the under side to embrace the sides of the ratchet-bar, as clearly shown in Figs. 5 and 10. The upright part of the angle-piece is pivoted or hinged to the carriage, as shown. This ratchet-bar in normal position is engaged by the knife-edged stop-lever 60, pivoted to rail 9, and held in engagement by the forked arm 61 of shaft 62. Said shaft is provided with an arm, 63, held in adjustment by set-screw 64, resting on arm 65 of shaft 144 of transverse lever 66. Shaft 62 is held and returned to normal position by a spring, 67, regulated as to tension by set-screw collar 68. A bracket, 69, carries a knife-edged bell-crank lever, 70, joined to the type-wheel lever 7 by a connecting-rod, 71, hooked or otherwise fastened thereto. (See Fig. 5.) Nuts 72 73 on the end of said rod serve to limit and regulate its movement with reference to the tooth-spaces of said rack-bar 59. The nuts 72 73 strike against a bracket-arm, 51, Figs. 9 and 18, limiting the movement of rod 71 and the vibration of type-wheel shaft.

The operation of this mechanism is as follows: On operating a given key-lever transverse lever 66 is lifted from normal position on adjusting-pin 74 and communicates its movement through arms 65 and 63 to shaft 62 and forked arm 61, which disengages rack-bar 59 from stop-lever 60 and brings it into engagement with bell-crank lever 70, and this, moving the distance of a tooth interval of rack-bar 59, pulls the connecting-rod 71 and lever 7 and propels the type-wheel against the platen and allows the paper-carriage to move forward the distance of a tooth corresponding to the distance between two letters. A spring, 147, connecting lever 7 with standard 117, retracts the type-wheel to normal position.

It is obvious that any other form of type-carrier in which the type are all moved together, as well as that of the type-wheel, might be employed in combination with the automatic striking mechanism above described.

The adjusting-screw 64 on arm 63 determines the instant of time when the trip of the type-wheel takes place for all the keys in common, and the adjusting screw-pins 74 make a supplementary adjustment of the same for each key-lever to counterbalance accidental inequalities in the movement of said lever. The relative rotary and forward movements of the type-wheel are so adjusted through regulator-pins of driver-lever 3, check-pin shaft 26, and lever 66 as to make sure that the rotary movement shall be complete and the type-wheel in proper position for striking before it strikes.

Having thus described the mechanism controlling the movements of the type-wheel, the feed movement will now be set forth.

Figures 11, 12, 13:
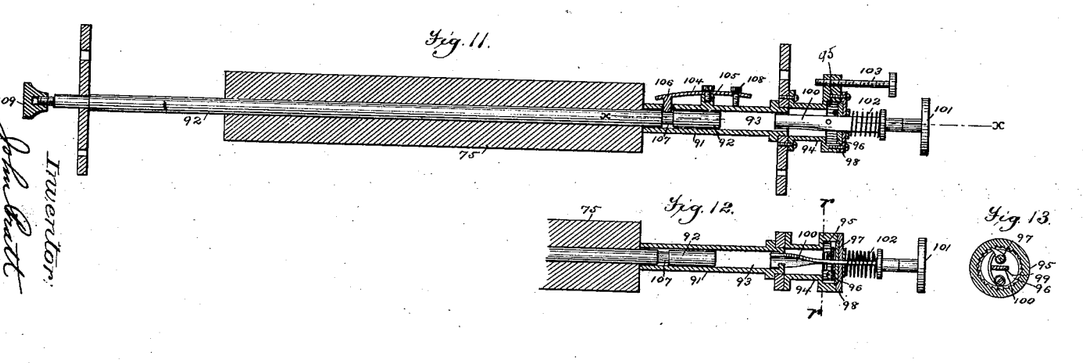
Fig. 11 is a view in longitudinal section through paper-feed roll.
Fig. 12 is a section through line *x x* of Fig. 11.
Fig. 13 is a section through line *r r*, Fig. 12.

The paper-carriage is formed with a large roll, 75, a smaller roll, 76, a cross-bar, 78, held by nuts, platen 79, and scroll 80. The large roll 75 rotates in the uprights 77. The smaller roll has its bearings in the ends of spring-arms 81, which serve to press the rolls together. These spring-arms are fastened to cross-bar 78 by means of slotted ends and set-screws 82 to allow of parallel adjustment of the rolls. Bails 83 and 84 are mounted on the paper-carriage for a purpose hereinafter explained. The paper-carriage is mounted on rollers 85, which travel in a grooved rail, 9, thereby diminishing friction. The paper-carriage is sustained in an upright position by a bent arm, 86, fixed to the back of cross-bar 78 and having a roller, 87, on its lower end, which travels on the base-frame of the machine and beneath a guide-bar, 88. Roller 87 is mounted on an arm, 89, pivoted to arm 86, and held in position by a spring, 90, which holds it in normal upright position against a pin, 90', the object of which will be explained directly. The roll 75 is rotated against the roll 76 for interlinear spacing by a screw-and-ratchet device at its left. This consists of a sleeve, 91, a portion of which incases one end of the shaft 92 of roll 75, and having a slit, 93, in its closed outer end for the passage of the screw-formed end of the screw-plunger 100, a drum, 94, placed in line with sleeve 91 and having in its flange a fixed ratchet-ring, 95, and concentric within said ring a rotating disk, 96, carrying a spring-pawl, 97, and kept in place by a cap, 98, screwed onto the end of the drum. Sleeve 91 turns freely in the carriage end to which the drum 94 is securely fixed, as shown in Fig. 11. Disk 96 has a slit, 99, in axial line with the slit 93. In these two slits slides a plunger-screw, 100, terminating in a presser-head, 101. The part of said plunger working in the slit 99 is straight. That which is twisted into screw form works in slit 93. A spiral spring, 102, encircles plunger-screw 100 and serves to bring it to a normal position. In operating this mechanism it is only necessary to press the plunger, when the screw-flange, held to its position by the pawl and ratchet-ring, causes the screw end of the plunger to rotate the sleeve 91 and the roll the distance between two lines of print. When the presser-head 101 is released, the plunger is retracted, its spiral recoil being communicated to the disk through the screw, and the disk therefore rotated by this back movement a distance corresponding to the forward movement of the rolls.

Thumb-screw 103 regulates the degree of movement of the plunger and the distance between lines. Instead of employing a fixed ratchet-ring and rotating pawl, the disk may be ratcheted and the pawl stationary on the periphery of the drum. Sleeve 91 is not fixed immovably to shaft 92, but is held to it by friction. To this end a stiff spring, 104, is employed, balanced on a boss, 105, and carrying a pin, 106, on one end, passing through a hole in the sleeve and resting in a groove, 107, in the shaft. One end of this spring-arm has a regulating-screw, 108, to adjust the degree of friction between the shaft and the sleeve. The object of this device is that the roll may be rotated not only in the normal direction permitted by the pawl and ratchet-ring described, but also in the opposite direction without disturbing said pawl. The paper is thus quickly manipulated up or down by one hand without disengaging the ratchet. Thumb-screw 109 is employed for this purpose. It remains to set forth how the paper-carriage moves laterally. A step-by-step escapement-movement is employed and is substantially the same as already used by me in prior patents, except that the ratchet-bar, as described above, is moved in alternate engagement with a pointed bell-crank lever and a pivoted stop. The stop-lever 60 is pivoted to rail 9 and held in position by spring 110, so that it opposes no resistance to the retraction of the carriage.

In order to move the carriage forward free of ratchet-bar, it is only necessary to tilt it back against the spring 90 on bent arm 86, which keeps it in normal position until the ratchet-bar is depressed below the stop-lever 60, thus allowing the main spring 57 to draw it forward.

The bail 84 supports the paper and the bail 83 presses it in close contact with the platen. The paper may be inserted either at the back or front of the rolls. The mode in which the transverse lever moves the hinged rack-bar to cause the type-wheel to strike has been shown, and since the same movement causes the forward movement of the carriage it is only necessary to describe the operation of the space-key lever. The space-key lever 111, through adjusting-pin 112, Figs. 6 and 3, and arm 113, operates shaft 62 directly, and thus rocks the hinged ratchet-bar; but as this causes the type-wheel to be brought toward the platen it is necessary to prevent its striking and making an impression. For this purpose an arm, 114, having a pivoted bent lever, 115, is attached to shaft 144, and an arm, 148, is secured to the lower part of bent lever 7. The arm 148 is in the same vertical plane with the lever 115. By the rotation of shaft 144 the lever 115 is carried out of the way of arm 148 when it rises with lever 7 upon a key-lever being struck; but when the space-key lever is struck, the shaft 144 having no movement, the lever 115 stops the upward movement of arm 148, and so prevents the type-wheel from making an impression. When the arm 148 is returning to normal position after the type-wheel has been operated by a key-lever, it hits the lever 115, tilts the latter out of the way, and thus passes it. Transverse lever 66 and driver-lever 3 have a break in the middle in a line with the space-key lever 111, and therefore are not operated thereby. The space-key is operated by shift-bar 4, the latter being directly connected thereto. After shift-bar 4 has been depressed it must of course be released before another key is operated.

The ribbon-guide consists of bent arms 116, hinged to standard 117 and having flanged uprights 118, around which the ribbon passes in front of the platen. A hanger, 119, connects ribbon-guide with transverse lever 66. By means of this mechanism the ribbon is moved in and out of the field of impression, displaying the letter as soon as it is made.

Figure 1:
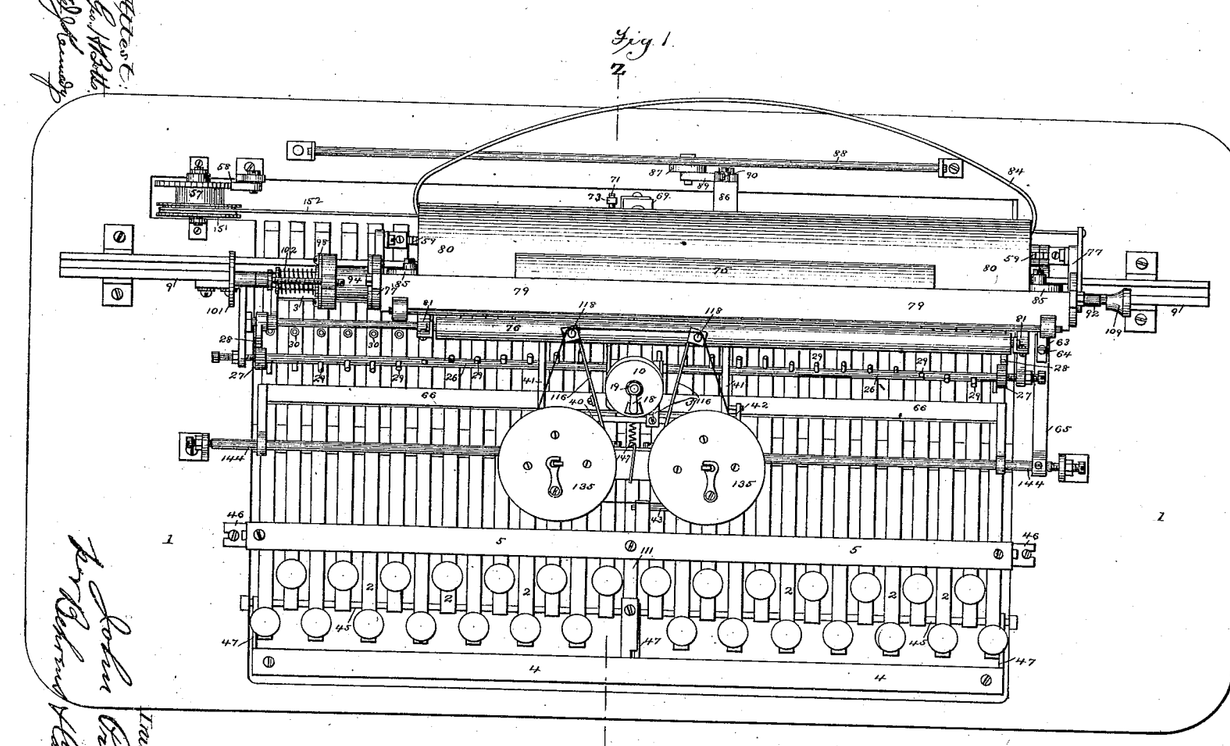
Figure 1 is a plan view of a type-writing machine embodying my improvements.

The ink-ribbon mechanism consists of spools 135 on shafts 136, one of which is screw-threaded, ratchet-wheels 137, pawls 134, pivoted to levers 138, loosely mounted on spool-shafts 136, spiral spring 140, connecting-pawls 134, and forked arms 142 on the transverse lever-shaft 144, engaging the levers 138. The spools 135 are latched to their shafts, as shown in Fig. 1, so as to be readily removed and supplied with fresh ribbon. The pawls 134 are mounted and hinged on levers 138, which are pivoted on spool-shafts 136. Said levers, and through their intervention said pawls, are operated by forked arms 142, which are fixed upon and project upward from shaft 144, which is operated by the key-levers. Both pawls are operated by said shaft simultaneously, but only one at a time is, as shown hereinafter, in engagement with its respective ratchet-wheel. Said ratchet-wheels 137, in which spool-shafts 136 are stepped, alternately rotate said shafts with their respective ribbon-spools.

122 indicates a nut guided by the standard 117, and traveling up and down on the screw-threaded right-hand ribbon-spool shaft, and having a pin, 123, engaging a slotted arm, 124, pivoted to standard 117. Pivoted arm 124 has a slot, 125, whose ends strike against a pin, 126, on a disk, 127, having arms 128 129. The upper arm, 128, engages the notches of a spring-actuated arm, 130, and the lower arm, 129, actuates a slotted plate, 131, on standard 117, bent so as to be held to place by friction, or, in lieu of being bent, provided with friction-washers, and sliding upon set-screws 132, having end projections acting against the rear end of pawls 134. The arm 129 actuates the plate 131 by striking against lugs 150 thereon, thus moving the plate to right or left. The ribbon is wound from one spool to the other, and vice versa. In doing this it is necessary either to shift the gearing of the spools by hand or automatically. The former is objectionable, because a momentary inattention to the condition of the spools causes bad work or interrupted feed, and it is desirable to have the attention concentrated on the work. For this purpose I employ an automatic device consisting of the parts above named.

The operation is as follows: Suppose the pawl and ratchet on the right hand of the standard 117 to be in engagement and the right-hand spool drawing the ribbon from the left-hand spool. The nut will in this case travel up its shaft and the upper end of slot 125 of lever 124 will in the latter part of its movement bear against the pin 126 in disk 127 of lever-arms 128 129 and move upper arm, 128, to the left. As soon as the point of arm 128 has reached the edge of its notch in arm 130, it will slip to the bottom of the next notch, owing to the spring of arm 130. This will cause the lower arm, 129, to snap to the right, carrying with it friction-slide 131 and driving the end of the latter against the rear end of right-hand pawl and disengaging it from its ratchet-wheel. At the same moment the spiral spring 140, connecting the two pawls, will bring left-hand pawl into engagement with left-hand ratchet-wheel. The left spool will now revolve opposite to its former direction and cause the right-hand spool to reverse and the nut to travel down the screw-threaded shaft, throw lever-arm 128 into its first notch, and so on interchangeably. Friction-slide 131 remains in position where last thrown, and so keeps its pawl out of engagement after lever 128 has left it and until the shift is completed.

In order that the adjusting-pins on the key-levers may strike squarely against the ends of the check-pins, the key-lever pins are provided with square heads in the shape of nuts 149, as shown in Fig. 2.

I disclaim the following device: "in a typewriting machine, a type-wheel, gear-arms, and a series of key-levers, each lever provided with two projections, one for actuating said type-wheel and the other for arresting its motion, combined with interfering mechanism, substantially as described," as I am not the first inventor thereof.

I disclaim the following device: "in a typewriting machine, the combination of gear-arms, a type-wheel shaft, and a pinion carried by said shaft, said arms being brought independently in gear with said pinion to rotate said type-wheel in either direction from a fixed point, substantially as described," as I am not the first inventor thereof.

Having described my invention, what I claim is—

1. The combination, with a striking type-carrier, of a platen, a spring-actuated paper-carriage, and connections, substantially as described, between the type-carrier and the paper-carriage, whereby the type-wheel is impelled against the platen, substantially as described.

2. The combination, with a driver-lever, of a striking type-carrier connected with and rotated by said lever, a spring-actuated paper-carriage and connections, substantially as described, between the type-carrier and the paper-carriage, substantially as described.

3. The combination, with key-levers and driver-levers, of a striking type-carrier, a paper-carriage, and mechanism, substantially as described, connecting the type-carrier with the paper-carriage, substantially as described.

4. The combination, with key-levers, driver-levers, and check-pin shafts, of a striking type-carrier, a spring-actuated paper-carriage, and mechanism, substantially as described, connecting the type-carrier with the paper-carriage, substantially as described.

5. The combination, with a striking type-carrier, of a spring-actuated paper-carriage having an escapement connecting it with the type-carrier, substantially as described.

6. The combination, with a striking type-carrier, of a spring-actuated paper-carriage having a rocking rack-bar and an escapement connected with the type-carrier, substantially as described.

7. The combination, with key-levers having adjusting screw-pins, of check-pin shafts with the check-pins arranged spirally thereon, substantially as described.

8. The combination, with the key-levers having adjusting screw-pins, of transverse lever having an arm actuating an adjustable lever-arm on the mechanism, substantially as described, for operating the escapement of the paper-carriage, substantially as described.

9. The combination, with a striking type-wheel, of a detachable shifter-arm moving with the type-wheel having two slotted projections engaging the type-wheel sleeve and giving vertical and allowing rotary motion of the latter, substantially as described.

10. The combination, with a striking type-wheel and its detachable shifter-arm, of a pivoted lever operated by a shift-bar, substantially as described.

11. The combination, with a shift-bar and space-key lever having an adjusting-pin, of a shaft with an arm bearing upon the adjusting-pin and the paper-carriage rack-bar, substantially as described.

12. A retracting device for a striking type-wheel shaft, consisting of reverse spiral springs, adjustable fixed collars to which the outer ends of the springs are secured, a central fixed collar and on either side of it a loose collar or ring to which the inner end of each spring is secured, and which has a flange abutting in one direction against a projection adjacent thereto, substantially as described.

13. The combination, with a paper-carriage, of a bent arm, a roller and spring, and guide-bar, the roller being held by the spring, so as to permit the release of the rack from the stop-lever, substantially as described.

14. The combination, with type-wheel shaft and driver-levers, of cheek-pin shafts and key-levers, substantially as described.

15. The combination, with a striking type-wheel and check-pin shafts, of key-levers having adjusting-pins and driver-levers having toothed segments engaging pinions on the outer ends of said check-pin shafts, substantially as described.

16. An automatic reversing-gear for ribbon-spools, consisting of a nut traveling up and down on the thread of one of the spool-shafts, a slotted lever connected thereto, a friction-slide, substantially as described, acting against the pawls of the spool-shafts one at a time, a lever actuated by the slotted lever, and a spring-actuated tripping-lever, substantially as described.

17. The combination, with transverse lever-shaft having arms engaging pawl-operating levers, the spool-shaft ratchet-wheels, the spool-shafts, and mechanism, substantially as described, for reversing the ribbon-spool shafts, substantially as described.

18. The combination, with a sliding friction-plate alternately holding one or the other of the spool-shaft pawls out of engagement, of a lever operating the friction-plate, a spring-actuated notched arm co-operating with the said lever, a slotted lever operating said first-named lever, and a nut traveling up and down on the thread of one of the spool-shafts, substantially as described.

19. The combination, with ribbon-spool shafts having ratchet-wheels and pawls, of transverse lever-shaft having forked arms engaging the pawls of ribbon-spool shafts, substantially as described.

20. In a type-writing machine, an interlinear spacing device consisting of a plunger-screw engaging a slotted projection connected with the feed-roll and a slotted disk in the carriage-frame, combined with a pawl and ratchet, substantially as described.

21. In a type-writing mechanism, the combination, with a feed-roll, of a spring-retracted plunger-screw, a sleeve incasing the roll-shaft and having a slit in its outer end, a drum having a fixed ratchet-ring and concentric therein a rotating disk with a slit, and a spring-pawl, substantially as described.

22. The combination, in a type-writing mechanism, with a feed-roll, of a spring-actuated plunger-screw having a regulator-screw, substantially as described.

23. In a type-writing mechanism, the combination, with a feed-roll shaft, of a screw-and-ratchet mechanism and a sleeve held to the roll-shaft by friction, and a plunger-screw, substantially as described.

24. In a type-writing mechanism, the combination, with feed-roll shaft and screw-and-ratchet mechanism, of an adjustable friction device, substantially as described.

25. In a type-writing mechanism, a feed-roll having a thumb-screw at one end and a screw-and-ratchet mechanism at the other, with a sleeve held to the roll-shaft by friction, substantially as described.

26. The combination, with the feed-roll of a carriage, of a bearing holding a movable sleeve in which one end of the paper roll is frictionally held, substantially as described.

In testimony whereof I have hereunto subscribed my name.

JOHN PRATT.

Witnesses:
EDWARD W. CADY,
JNO. E. GAVIN.